United States Patent
Don et al.

(10) Patent No.: US 9,983,812 B1
(45) Date of Patent: May 29, 2018

(54) AUTOMATED NODE FAILURE DETECTION IN AN ACTIVE/HOT-STANDBY STORAGE CLUSTER

(71) Applicant: EMC Corporation, Hopkinton, MA (US)

(72) Inventors: Arieh Don, Newton, MA (US); Ian Wigmore, Westborough, MA (US); Stephen Smaldone, Woodstock, CT (US)

(73) Assignee: EMC IP Holding Company LLC, Hopkinton, MA (US)

( * ) Notice: Subject to any disclaimer, the term of this patent is extended or adjusted under 35 U.S.C. 154(b) by 39 days.

(21) Appl. No.: 15/181,347

(22) Filed: Jun. 13, 2016

(51) Int. Cl.
*G06F 12/00* (2006.01)
*G06F 3/06* (2006.01)
*G06F 11/07* (2006.01)

(52) U.S. Cl.
CPC ............ *G06F 3/0619* (2013.01); *G06F 3/065* (2013.01); *G06F 3/067* (2013.01); *G06F 3/0665* (2013.01); *G06F 11/0757* (2013.01)

(58) Field of Classification Search
CPC ............ G06F 11/0757; G06F 11/2023; G06F 11/2048; G06F 11/2097; G06F 11/2069; G06F 3/0617; G06F 3/065; G06F 3/0689; G06F 3/0619; G06F 3/067
See application file for complete search history.

(56) References Cited

U.S. PATENT DOCUMENTS

| | | | | |
|---|---|---|---|---|
| 2005/0229034 A1* | 10/2005 | Fujibayashi | ........ | G06F 11/0727 714/11 |
| 2012/0192006 A1* | 7/2012 | Qi | ........ | G06F 11/0757 714/6.22 |
| 2013/0054533 A1* | 2/2013 | Hao | ........ | G06F 17/30 707/649 |
| 2015/0370502 A1* | 12/2015 | Aron | ........ | G06F 3/0626 711/162 |
| 2016/0085462 A1* | 3/2016 | Buzzard | ........ | G06F 3/067 711/162 |

* cited by examiner

*Primary Examiner* — Hashem Farrokh
(74) *Attorney, Agent, or Firm* — Womble Bond Dickinson (US) LLP

(57) ABSTRACT

According to one embodiment, a secondary primary storage system monitors replicated data received from a primary storage system, where the primary storage system provides primary storage services to a host device and the second storage system operates as a redundant storage system. In response to determining that no replicated data has been received from the primary storage system over a first predetermined period of time, the secondary primary storage system determines an amount of read/write data requests have been received from the host device for a second period of time. The secondary primary storage system transitions into a second primary storage system in response to determining the amount of read/write data requests received from the host exceeds a predetermined threshold.

21 Claims, 4 Drawing Sheets

AUTOMATED NODE FAILURE DETECTION IN AN ACTIVE/HOT-STANDBY STORAGE CLUSTER

FIELD OF THE INVENTION

Embodiments of the present invention relate generally to data storage systems. More particularly, embodiments of the invention relate to clustered data storage systems.

BACKGROUND

A "storage cluster" environment has one or more hosts connected to two primary (or protection) storage systems clustered as shown in FIG. 1. For simplicity, referring to FIG. 1, assuming host 101 (with multi-pathing) is connected to two storage systems 102-103. Typically, clustered storage systems 102-103 may be connected to host 101 in an active/active configuration. In such active/active configuration, host 101 sends input and output (IO) requests to both storage systems and data flows between the storage systems 102-103. If one system fails, the host works with the surviving system without disruption.

Alternatively, the storage systems can be configured in an active/passive configuration. In such active/passive configuration, host 101 sends the IO requests to the active storage system 102, which updates the passive system 103. When active system 102 fails, host 101 may crash and a user has to switch the passive system 103 to be active and reboot host 101, which causes interruption.

Furthermore, the storage systems can be configured in an active/hot-standby (HS) configuration. In such active/HS configuration, host 101 sends IO requests to active system 102, which updates HS system 103. Host 101 is also connected to HS system 103, whose storage devices are ready and discovered by host 101, but would not service the commands from host 101. When active system 102 fails, HS system 103 must verify that active system 102 is down and then quickly, with no customer impact, becomes active. If HS system 103 becomes active concurrently with the original active system 102, it will cause errors. There has been a lack of efficient way to verify whether the original active storage system is actually down without a third-party witness.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a methodology is utilized allowing an HS storage system to detect and verify that a corresponding active storage system has indeed failed. In one embodiment, a heartbeat (HB) message and a response are periodically exchanged between the active storage system and the HS storage system. If the HS storage system detects that there is no heartbeat message received for a predetermined period of time, the HS storage system may monitor the frequency of read or write (read/write) requests (also referred to as data IO requests or data commands) received from the host. If the primary storage system fails, it cannot simply become active again (e.g., starting servicing data requests again) without receiving heartbeat messages from the second storage system. When the active storage system is up, it will receive most or all IO requests from the host, because the secondary primary storage system will reject the data read/write requests received from the host. If the active storage system fails, the host will divert all read/write requests to the HS storage system as a last resort. On the HS storage system, the lack of heartbeat messages from the active storage system, combined with a dramatic increase in read/write requests from the host, is considered as a signal (to HS storage system) that the active storage system is down, and the HS storage system can safely become active. Such techniques can prevent both storage systems from becoming active concurrently.

Figure 1:
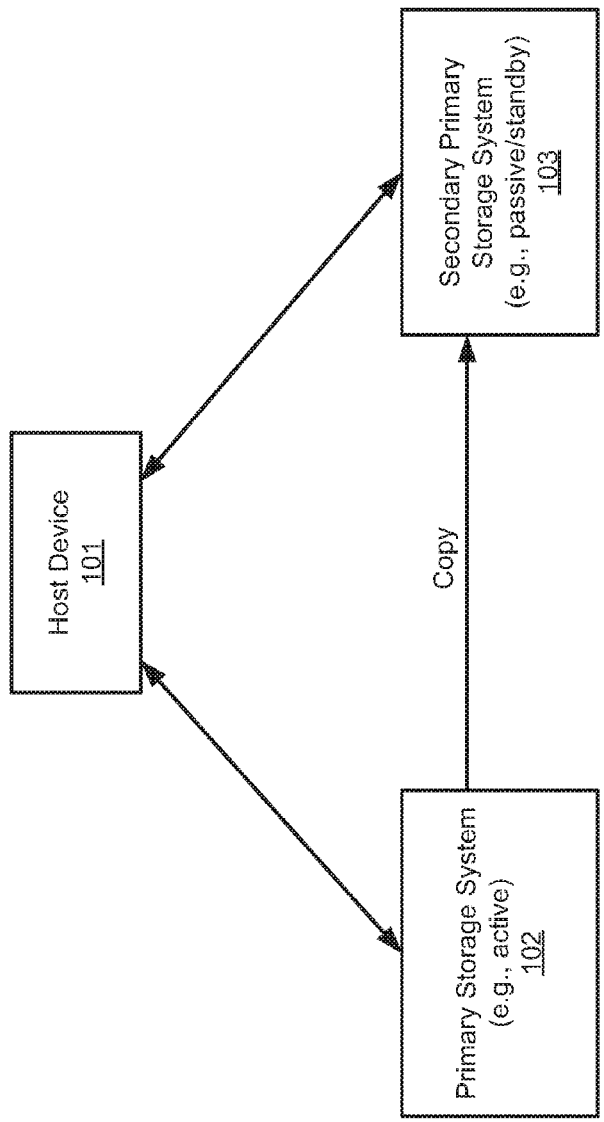
FIG. 1 is a block diagram illustrating a typical clustered storage system.
Figure 2:
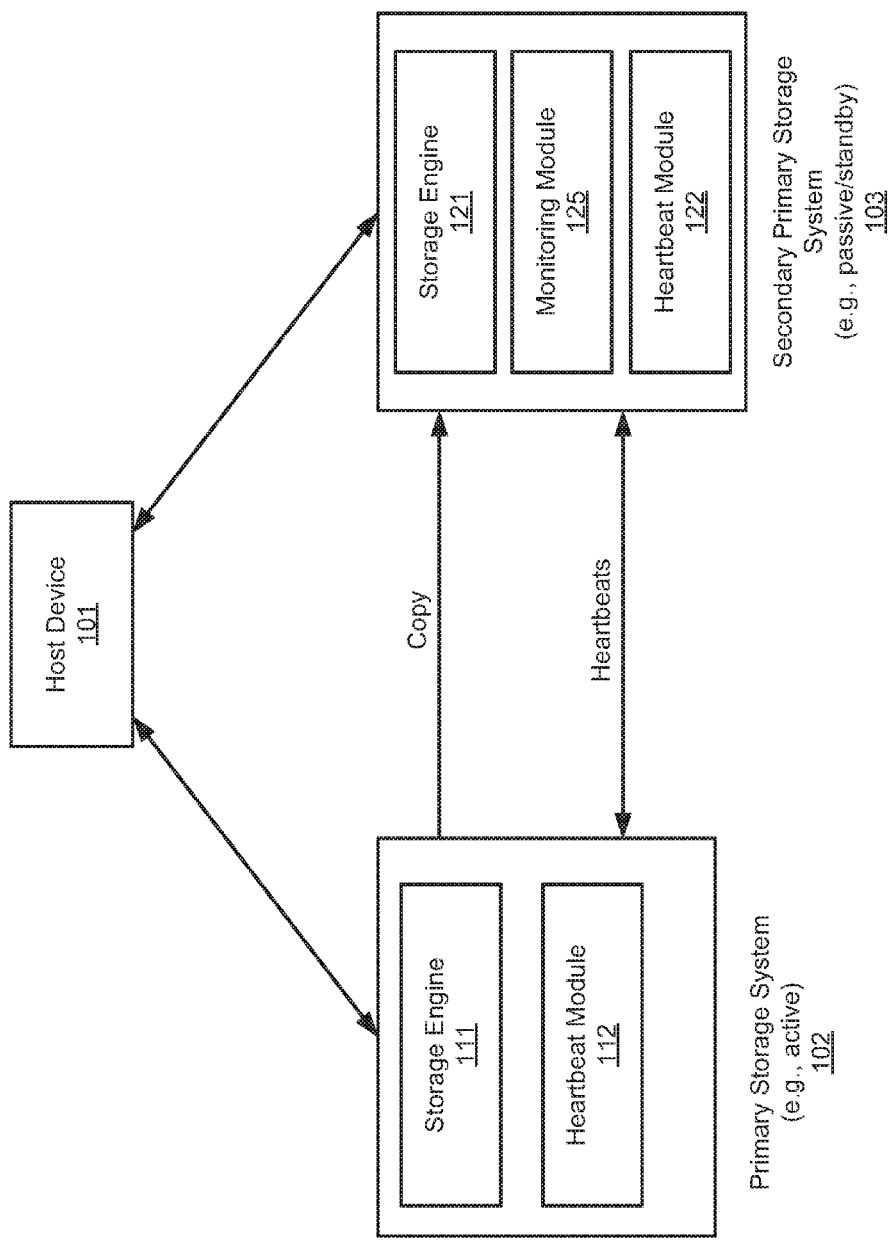
FIG. 2 is a block diagram illustrating a clustered storage system according to one embodiment of the invention.

FIG. 2 is a block diagram illustrating a clustered storage system according to one embodiment of the invention. Referring to FIG. 2, host 101 is communicatively coupled to storage systems 102-103, for example, over a network. In this example, storage system 102 operates as a primary storage system (i.e., an active storage system), while storage system 103 operates as a secondary primary storage system in a form of an HS storage system. Storage systems 102-103 may have the identical or similar architecture and include certain storage components that are common to a storage system.

For example, any of storage system 102-103 may be a storage server used for various different purposes, such as to provide multiple users or client systems with access to shared data and/or to back up (or restore) data (e.g., mission critical data). Storage systems 102-103 may provide storage services to clients or users via a variety of access interfaces and/or protocols such as block-based access protocols. The block-based access protocols may include the small computer system interface (SCSI) protocols, Internet SCSI or iSCSI, and Fibre channel (FC) protocol, etc.

In one embodiment, primary storage system 102 includes, but is not limited to, storage engine 111 and heartbeat module 112. Storage engine 111 is to provide storage services to host 101 (e.g., servicing IO requests) for accessing data stored in a storage device associated with primary storage system 102 (not shown). Similarly, secondary primary storage system 103 includes, but is not limited to, storage engine 121, heartbeat module 122, and monitoring module 125. Storage engine 121 is to provide storage services to host 101 (as needed). Both primary storage system 102 and secondary primary storage system 103 may share a set of storage devices (e.g., redundant array of independent disks or RAID). Heartbeat module 122 communicates with heartbeat module 112 of primary storage system 102 to exchange heartbeats and responses periodically.

In this example, for the purpose of illustration, primary storage system 102 operates as an active storage system, while secondary primary storage system 103 operates as an HS storage system. When host 101 writes data to primary storage system 102, the writes are serviced by storage engine 111 and the data is stored in a storage device associated with primary storage system 102 (not shown). In addition, a copy of the data is replicated to secondary primary storage system 103 to be stored in a storage device associated with secondary primary storage system 103 (not shown). Thus, for each write request received by primary storage system 102, a replication transaction is initiated from primary storage system 102 to secondary primary storage system 103. In addition, primary storage system 102 and secondary primary storage system 103 exchanges heartbeat messages via their respective heartbeat modules 112 and 122 periodically.

Furthermore, due to the configuration of clustered storage systems, host device may periodically send inquiries or other control commands to secondary primary storage system 103 to determine whether secondary primary storage system 103 is active and ready to service read/write data requests. In one embodiment, while storage system 103 operates an HS storage system, storage system 103 responds to the inquiry to host device 101 with a good status. The request received from host device 101 may be just a SCSI data command to read or write data. In response to a read/write data request, storage system 103 may simply return a check condition of 0x05/25, indicating that such a read/write data request is sent to an unsupported LUN. When storage system 103 becomes an active storage system, storage system 103 may simply service the read/write data requests received from host device 101. In response to the check condition of 0x05/25, host device 101 may temporarily suspend sending read/write data requests to storage system 103. After a while, host device 101 may restart sending read/write data requests to storage system 103. If at certain points, storage system 103 becomes active after it determines that primary storage system 102 indeed fails, storage system 103 simply starts servicing the read/write data requests received from host device 101 at the point in time.

In one embodiment, host device 101 communicates with storage systems 102-103 using small computer system interface (SCSI) protocols. In such a configuration, host device 101 operates as a SCSI initiator, while storage systems 102-103 operate as a SCSI target. When storage system 103 operates as an HS system, storage system 103 return a SCSI check condition response to host device 101 in response to SCSI data commands, for example, with a check condition of 0x05/25.

In SCSI terminology, a check condition occurs when a SCSI device needs to report an error. SCSI communication takes place between an initiator and a target. The initiator sends a command to the target which then responds. At the end of the command the target returns a status code byte which is usually 0x0 for a good status, 0x02 for a check condition (error), or 0x08 for busy. When the target returns a check condition in response to a command, the check condition includes a value of 0x05/25.

In one embodiment, storage system 103, as a SCSI target returns a check condition of 0x05/25. Such status code indicates that the requested operation was sent to an unsupported logical unit (LUN) as a way to tell host device 101 (as a SCSI initiator) that storage system 103 will not process data commands. Host device 101 may periodically keep trying by sending control commands and receiving good status from storage system 103 and sending data commands and receiving the check condition of 0x05/25 from storage system 103, until storage system 103 becomes active under certain predetermined conditions, which is monitored by monitoring module 125. In one embodiment, once primary storage system 102 becomes inactive, it cannot become active again without communicating with storage system 103 (operating an active storage system). In one embodiment, when storage system 102 restarts, it sends a message (e.g., heartbeat message) to storage system 103 that is operating as an active storage system. Storage system 103 may respond indicating whether it is operating as an active storage system. Storage system 102 may become active again only if storage system 103 clearly indicates that it is not operating as an active storage system. Note that although there are only two storage systems 102-103 shown, more storage systems may be configured as standby storage systems and any one of them can become active in the event storage system 103 fails using the techniques described throughout this application.

In addition, in one embodiment, heartbeat module 122 periodically sends a heartbeat message to primary storage system 102, which is handled by heartbeat module 112. Heartbeat module 112 then responds to the heartbeat message by returning an acknowledgement to heartbeat module 122 of storage system 103. By monitoring the heartbeat messages exchanged between storage systems 102-103 according to an expected schedule and/or monitoring the amount of data copied from storage system 102, monitoring module 125 can determine whether storage system 102 is still alive.

When primary storage system 102 fails, it fails to replicate data to secondary primary storage system 103. Storage system 102 may also fail to respond to heartbeat messages received from storage system 103. On the other hand, storage system 103 fails to receive the replicated data and/or responses to the heartbeat messages it sent. In such a scenario, it could be: 1) storage system 102 indeed fails; and/or 2) the network connection between storage systems 102-103 is broken (but storage system 102 operates properly). From storage system 103, it is difficult to verify whether storage system 102 indeed failed without a third-party witness or embodiments of the invention described herein.

In one embodiment, in addition to monitoring the replicated data and the responses to the heartbeat messages, monitoring module 125 also monitor the amount of read/write data requests received from host device 101. During the normal operations, host device 101 periodically sends SCSI control commands to storage system 103 and receives in return a good status. Host device 101 further periodically sends SCSI data commands and storage system 103 responds with a check condition of 0x05/25 indicating that the requested LUN is unsupported. When storage system 102 fails, host device 101 attempts to access the data through another path, i.e., through storage system 103. As a result, the amount of read/write data requests between host device 101 and storage system 103 will significantly increase. Such dramatic increase of read/write data requests, in combination of failure to receive replicated data and/or responses to heartbeat messages, can be utilized as an indication that storage system 102 indeed failed.

In one embodiment, when there is no replicated data and/or responses to heartbeat messages received from storage system 102 for a first predetermined period of time, monitoring module 125 examines a number of read/write data requests between host device 101 and storage system 103. If the number of read/write data requests during a second predetermined period of time in the past exceeds a predetermined threshold, monitoring module 125 can determine that storage system 102 indeed fails; otherwise, it can determine that storage system 102 is still operating properly. Rather, the network connection between storage systems 102-103 may be broken.

In response to determining that storage system 102 indeed fails, in one embodiment, storage system 103 becomes active. When storage system 103 becomes active, storage engine 121 starts servicing read/write data requests received from host device 101 and no longer returns a check condition that indicates an unsupported LUN.

Figure 3:
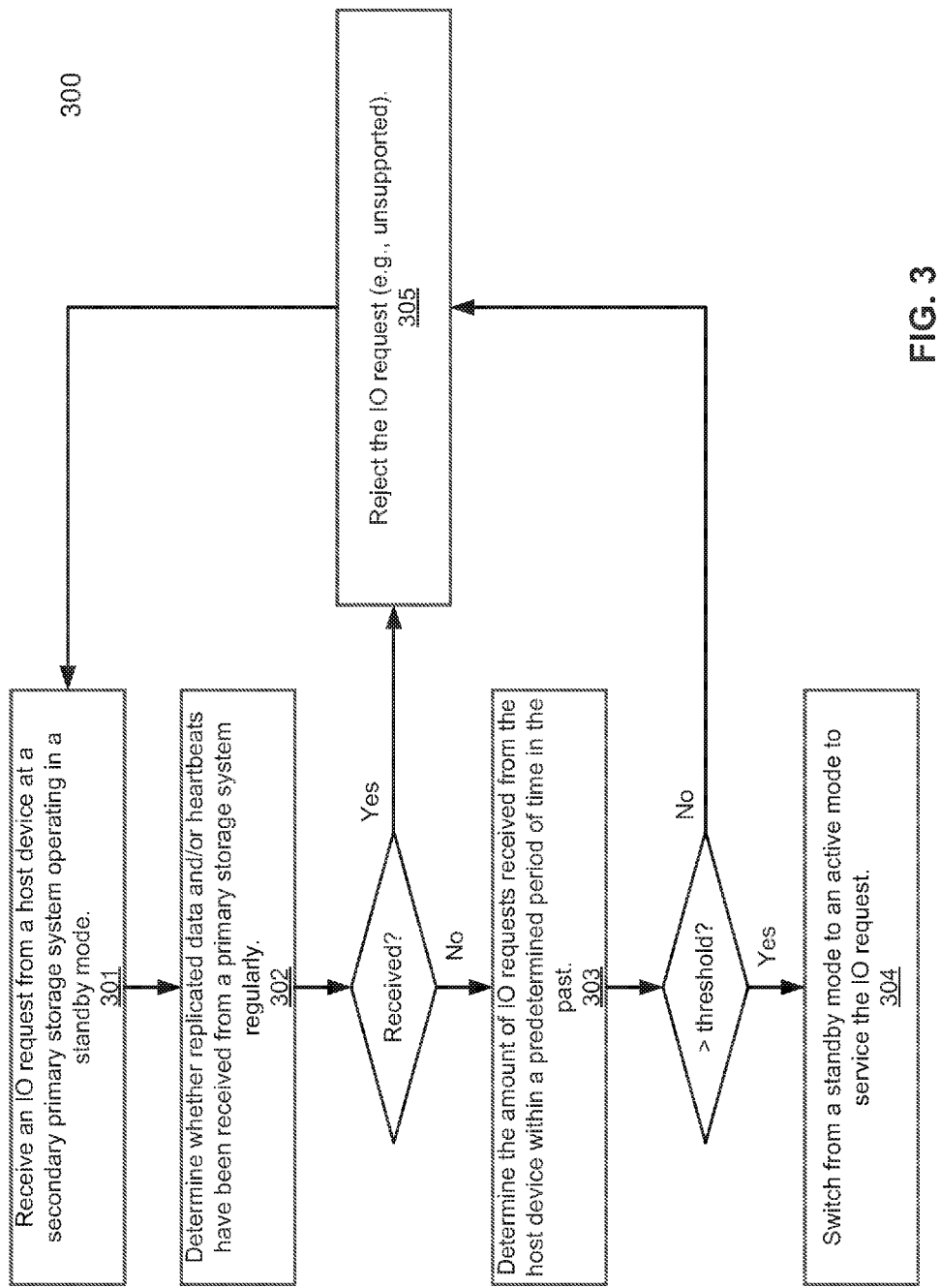
FIG. 3 is a flow diagram illustrating a process of providing clustered storage systems according to one embodiment of the invention.

FIG. 3 is a flow diagram illustrating a process of providing clustered storage systems according to one embodiment of the invention. Process 300 may be performed by processing logic which may include software, hardware, or a combination thereof. For example, process 300 may be performed by storage system 103 of FIG. 2. Referring to FIG. 3, at block 301, processing logic receives an IO request at a secondary primary storage system from a host device. At block 302, processing logic determines whether replicated data and/or responses to heartbeat messages have been received from a primary storage system within a first predetermined period of time in the past. If so, processing logic rejects the IO request at block 305, for example, by indicating that the corresponding LUN is not supported.

If it is determined that the replicated data and heartbeat responses have not been received from the primary storage system for the first predetermined period of time, at block 303, processing logic determines whether the amount of read/write data requests received from the host device in a second predetermined period of time in the past has exceeded a predetermined threshold. If so, the primary storage system is considered failed and at block 304, the secondary primary storage system transitions from a standby storage system to an active storage system. If it is determined that the amount of read/write data requests between the host device and the secondary primary storage system does not exceeds the predetermined threshold, at block 305, the request is rejected.

Figure 4:
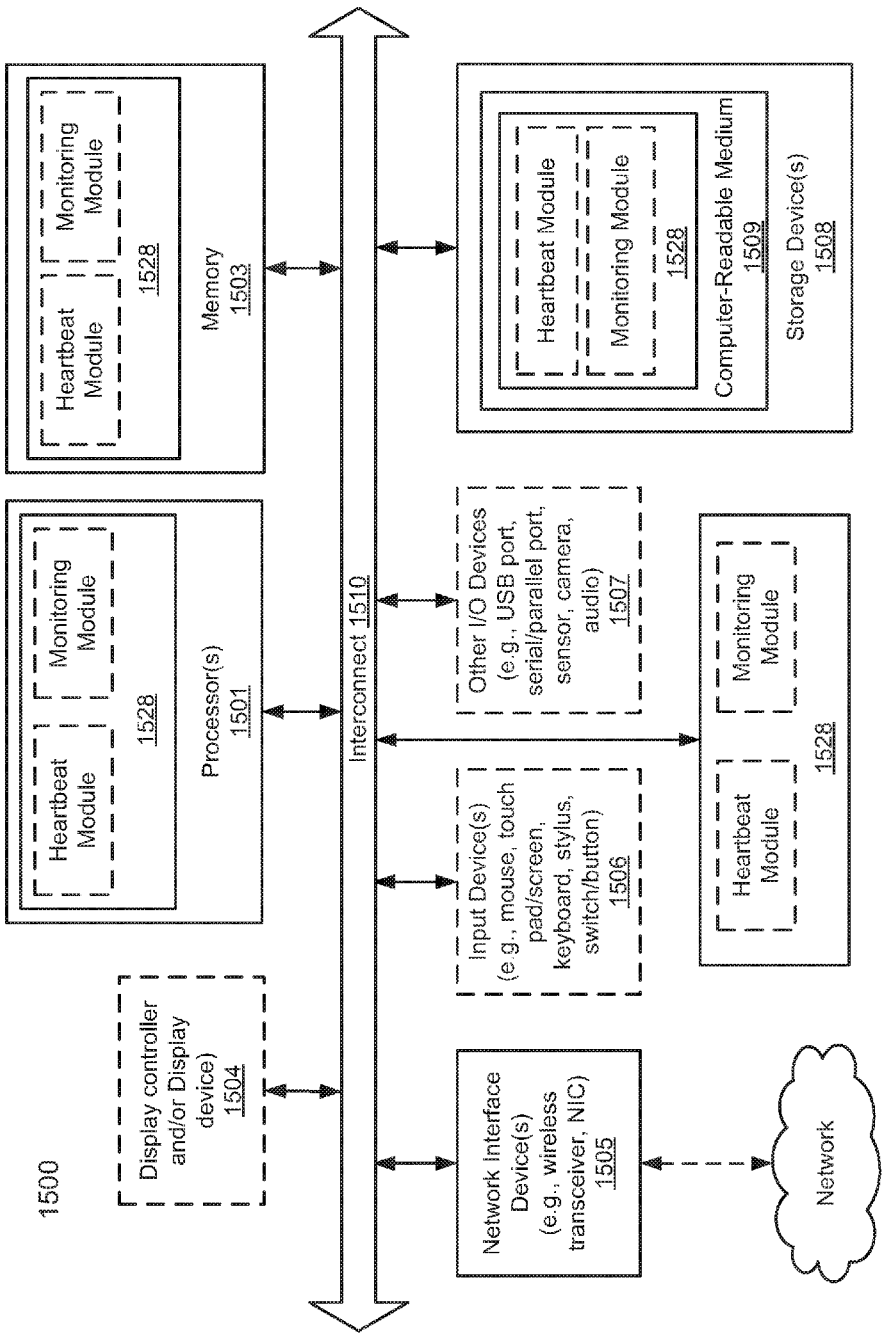
FIG. 4 is a block diagram illustrating a storage system according to one embodiment of the invention.

FIG. 4 is a block diagram illustrating an example of a data processing system which may be used with one embodiment of the invention. For example, system 1500 may represents any of data processing systems described above performing any of the processes or methods described above, such as, for example, systems 101-103 of FIG. 2. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output system (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for providing clustered storage services, the method comprising:
   monitoring at a secondary storage system replicated data received from a primary storage system, wherein the primary storage system provides primary storage services to a host device and the secondary storage system operates as a redundant storage system;
   in response to determining that no replicated data has been received from the primary storage system over a first predetermined period of time, determining an amount of read or write (read/write) data requests have been received from the host device for a second predetermined period of time; and
   transitioning the secondary storage system into a secondary primary storage system in response to determining the amount of read/write data requests received from the host exceeds a predetermined threshold.

2. The method of claim 1, further comprising:
   periodically transmitting a heartbeat message from the primary storage system to the secondary storage system; and
   monitoring responses to the heartbeat messages from the secondary storage system.

3. The method of claim 2, wherein the secondary storage system transitions to the secondary primary storage system in response to determining that no response to the heartbeat messages has been received over a second predetermined period of time.

4. The method of claim 1, further comprising:
   receiving a first read/write data request from the host device;
   in response to the first read/write data request, determining whether any replicated data has been received from the primary storage system during the first predetermined period of time in the past; and
   rejecting the first read/write data request in response to determining that replicated data has been received within the first predetermined period of time.

5. The method of claim 4, wherein rejecting the first read/write data request comprising returning a status code indicating the first read/write data request has been sent to an unsupported logical unit (LUN) of the primary storage system.

6. The method of claim 5, wherein transitioning the secondary storage system into a secondary primary storage system comprises servicing subsequent read/write data requests received from the host device, in response to determining that no replicated data has been received from the primary storage system within the first predetermined period of time in the past.

7. The method of claim 5, wherein rejecting the first read/write data request comprising returning a check condition of 0x05/25.

8. A machine-readable medium having instructions stored therein, which when executed by a processor, cause the processor to perform operations of providing clustered storage services, the operations comprising:
   monitoring at a secondary storage system replicated data received from a primary storage system, wherein the primary storage system provides primary storage services to a host device and the secondary storage system operates as a redundant storage system;
   in response to determining that no replicated data has been received from the primary storage system over a first predetermined period of time, determining an amount of read or write (read/write) data requests have been received from the host device for a second predetermined period of time; and
   transitioning the secondary storage system into a secondary primary storage system in response to determining the amount of read/write data requests received from the host exceeds a predetermined threshold.

9. The machine-readable medium of claim 8, wherein the operations further comprise:
   periodically transmitting a heartbeat message from the primary storage system to the secondary storage system; and
   monitoring responses to the heartbeat messages from the secondary storage system.

10. The machine-readable medium of claim 9, wherein the secondary storage system transitions to the secondary primary storage system in response to determining that no response to the heartbeat messages has been received over a second predetermined period of time.

11. The machine-readable medium of claim 8, wherein the operations further comprise:
  receiving a first read/write data request from the host device;
  in response to the first read/write data request, determining whether any replicated data has been received from the primary storage system during the first predetermined period of time in the past; and
  rejecting the first read/write data request in response to determining that replicated data has been received within the first predetermined period of time.

12. The machine-readable medium of claim 11, wherein rejecting the first read/write data request comprising returning a status code indicating the first read/write data request has been sent to an unsupported logical unit (LUN) of the primary storage system.

13. The machine-readable medium of claim 12, wherein transitioning the secondary storage system into a secondary primary storage system comprises servicing subsequent read/write data requests received from the host device, in response to determining that no replicated data has been received from the primary storage system within the first predetermined period of time in the past.

14. The machine-readable medium of claim 12, wherein rejecting the first read/write data request comprising returning check condition of 0x05/25.

15. A data processing system operating as a secondary storage system for providing clustered storage services, the system comprising:
  a processor; and
  a memory coupled to the processor to store instructions, which when executed by the processor, cause the processor to perform operations, the operations including
    monitoring replicated data received from a primary storage system, wherein the primary storage system provides primary storage services to a host device and the secondary storage system operates as a redundant storage system,
    in response to determining that no replicated data has been received from the primary storage system over a first predetermined period of time, determining an amount of read or write (read/write) data requests have been received from the host device for a second predetermined period of time, and
    transitioning the secondary storage system into a secondary primary storage system in response to determining the amount of read/write data requests received from the host exceeds a predetermined threshold.

16. The system of claim 15, wherein the operations further comprise:
  periodically transmitting a heartbeat message from the primary storage system to the secondary storage system; and
  monitoring responses to the heartbeat messages from the secondary storage system.

17. The system of claim 16, wherein the secondary storage system transitions to the secondary primary storage system in response to determining that no response to the heartbeat messages has been received over a second predetermined period of time.

18. The system of claim 15, wherein the operations further comprise:
  receiving a first read/write data request from the host device;
  in response to the first read/write data request, determining whether any replicated data has been received from the primary storage system during the first predetermined period of time in the past; and
  rejecting the first read/write data request in response to determining that replicated data has been received within the first predetermined period of time.

19. The system of claim 18, wherein rejecting the first read/write data request comprising returning a status code indicating the first read/write data request has been sent to an unsupported logical unit (LUN) of the primary storage system.

20. The system of claim 19, wherein transitioning the secondary storage system into a secondary primary storage system comprises servicing subsequent read/write data requests received from the host device, in response to determining that no replicated data has been received from the primary storage system within the first predetermined period of time in the past.

21. The system of claim 19, wherein rejecting the first read/write data request comprising returning check condition of 0x05/25.

* * * * *